US008818945B2

(12) United States Patent
Bhattacharya et al.

(10) Patent No.: US 8,818,945 B2
(45) Date of Patent: Aug. 26, 2014

(54) TARGETED MAINTENANCE OF COMPUTING DEVICES IN INFORMATION TECHNOLOGY INFRASTRUCTURE

(75) Inventors: Kamal Bhattacharya, Bangalore (IN); Anshu N. Jain, Karnataka (IN); Suman K. Pathapati, Andhra Pradesh (IN); Nidhi Rajshree, Karnataka (IN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 13/551,015

(22) Filed: Jul. 17, 2012

(65) Prior Publication Data
US 2014/0025627 A1 Jan. 23, 2014

(51) Int. Cl.
*G06F 7/00* (2006.01)
*G06F 17/00* (2006.01)

(52) U.S. Cl.
USPC .......................................................... 707/626

(58) Field of Classification Search
None
See application file for complete search history.

(56) References Cited

U.S. PATENT DOCUMENTS

| 2004/0064722 | A1 | 4/2004 | Neelay et al. | |
| 2004/0218615 | A1* | 11/2004 | Griffin et al. | 370/401 |
| 2005/0034114 | A1 | 2/2005 | Weik et al. | |
| 2008/0148066 | A1* | 6/2008 | Hazra | 713/190 |

OTHER PUBLICATIONS

PCT (WO 96/18951), Dunn et al., Methods and Apparatus for Protection of Executable Programs, Libraries and Data, Jun. 20, 1996.*
Mell et al., Creating a Patch and Vulnerability Management Program, Technical report, Special Publication 800-40 ver. 2, NIST, 2005.
Nicolett et al., Robust Patch Management Requires Specific Capabilities, Research Note T-19-4570, 2003.
Sihvonen et al., Improving Release and Patch Management Processes: An Empirical Case Study on Process Challenges, icsea, pp. 232-237, 2010 Fifth International Conference on Software Engineering Advances, 2010.
Kirk, Agent vs. Agentless, Article, 2005 http://www.tomshardware.com/reviews/patch-management-enterprise,1143-4.html.
Gupta et al., Using Predators to Combat Worms and Viruses: a Simulation-Based Study, Proc. of Computer Security Applications Conference, Tucson, Arizona, USA, Dec. 2004, 116-12.

* cited by examiner

*Primary Examiner* — Taelor Kim
(74) *Attorney, Agent, or Firm* — Ryan, Mason & Lewis, LLP

(57) ABSTRACT

Techniques, an apparatus and an article of manufacture for targeted maintenance of computing devices in a system. A method includes assessing a maintenance request to determine a class of computing devices to which the request applies, selecting a propagation mechanism applicable to the class of computing devices, generating an agent based on the propagation mechanism to carry out the maintenance request on the class of computing devices, deploying the agent on at least one computing device in the class of computing devices, and propagating the agent to additional devices in the class of computing devices.

25 Claims, 9 Drawing Sheets

TARGETED MAINTENANCE OF COMPUTING DEVICES IN INFORMATION TECHNOLOGY INFRASTRUCTURE

FIELD OF THE INVENTION

Embodiments of the invention generally relate to information technology (IT), and, more particularly, to IT infrastructure maintenance.

BACKGROUND

In many information technology (IT) infrastructures, updates and maintenance patches to computing device configurations need to be rolled out frequently to ensure that systems are up-to-date with stable configurations and protected from vulnerability. However, due to complexities, scale and frequent changes in IT infrastructure during the course of service, computing devices can be overlooked in some systems. Once such devices become undiscoverable, they cannot be tracked, maintained or audited. Moreover, such devices are often only rediscovered when they cause catastrophic failures.

The cost of non-discoverability of one server can lead to gross service level agreement (SLA) breaches, resulting in potentially significant financial losses. This can be particularly problematic because, being undiscovered, unaccounted server failures are more difficult to diagnose, trace and recover from.

Additionally, complexities in tracking and maintenance of computing devices in dynamic networks have increased due to an increase of heterogeneous computing devices. This may leave infrastructure vulnerable to software failures as well as intrusion and exploitation by unwanted programs and/or users.

Existing approaches for infrastructure maintenance include agent-based maintenance and management. However, such approaches require knowledge of the system a priori. Additionally, existing agent-less management approaches disadvantageously cannot locate every workstation and server that needs to be managed within a system.

SUMMARY

In one aspect of the present invention, techniques for targeted maintenance of computing devices in IT infrastructure are provided. An exemplary computer-implemented method for targeted maintenance of computing devices in a system can include steps of assessing a maintenance request to determine a class of computing devices to which the request applies, selecting a propagation mechanism applicable to the class of computing devices, generating an agent based on the propagation mechanism to carry out the maintenance request on the class of computing devices, deploying the agent on at least one computing device in the class of computing devices, and propagating the agent to additional devices in the class of computing devices.

In another aspect of the invention, an exemplary computer-implemented method for generating an agent to carry out targeted maintenance of computing devices in a system can include steps of instantiating an agent template, updating at least one propagation module on the agent template, configuring the agent template for a targeted class of computing devices for which the maintenance will be carried out based on at least one class feature, inserting code into the agent template that is to be executed on the targeted class of computing devices, and configuring the agent template to have a specified agent lifespan and propagation rate.

Another aspect of the invention or elements thereof can be implemented in the form of an article of manufacture tangibly embodying computer readable instructions which, when implemented, cause a computer to carry out a plurality of method steps, as described herein. Furthermore, another aspect of the invention or elements thereof can be implemented in the form of an apparatus including a memory and at least one processor that is coupled to the memory and operative to perform noted method steps.

Yet further, another aspect of the invention or elements thereof can be implemented in the form of means for carrying out the method steps described herein, or elements thereof; the means can include (i) hardware module(s), (ii) software module(s), or (iii) a combination of hardware and software modules; any of (i)-(iii) implement the specific techniques set forth herein, and the software modules are stored in a tangible computer-readable storage medium (or multiple such media).

These and other objects, features and advantages of the present invention will become apparent from the following detailed description of illustrative embodiments thereof, which is to be read in connection with the accompanying drawings.

DETAILED DESCRIPTION

Figure 1:
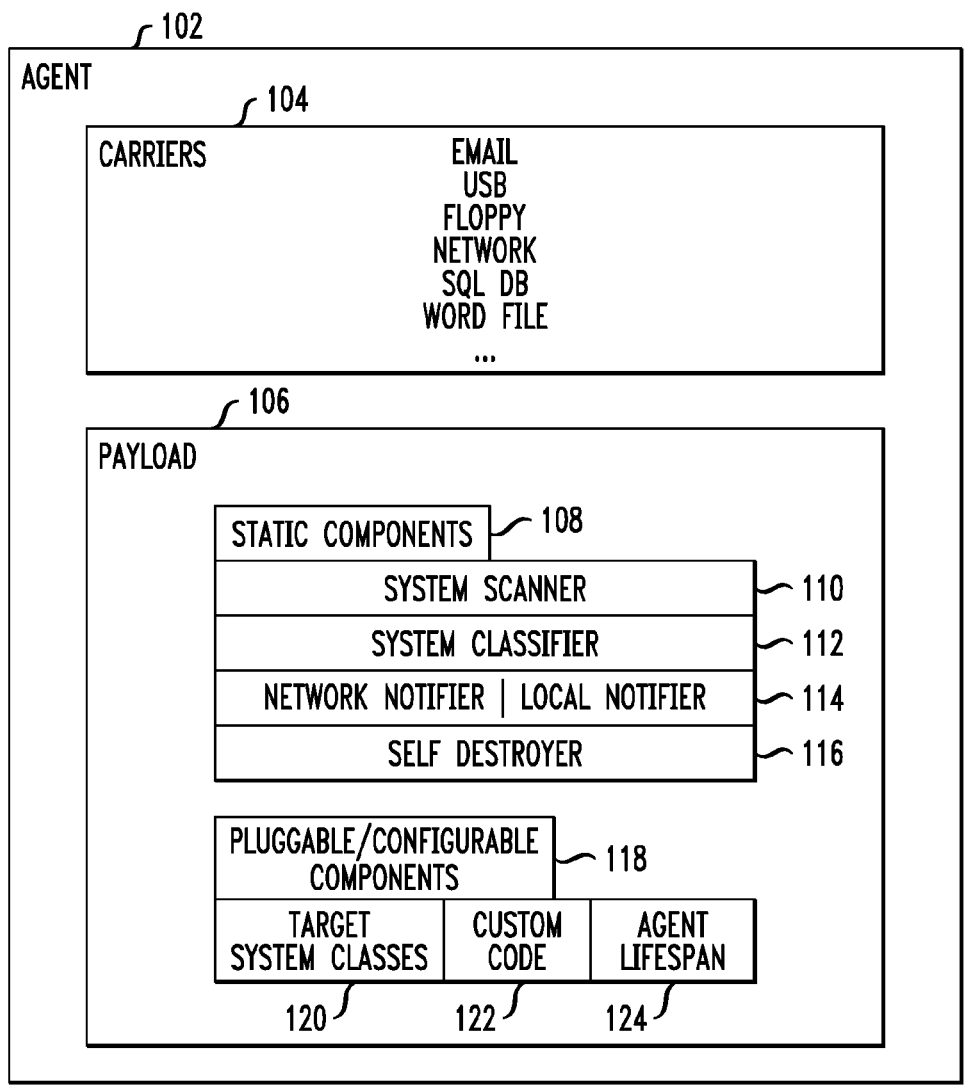
FIG. 1 is a diagram illustrating an agent skeleton, according to an embodiment of the present invention.

As described herein, an aspect of the present invention includes discovery and targeted maintenance of vulnerable computing devices in IT infrastructure. At least one embodiment of the invention includes propagating a software code to a set of targeted nodes in a computer network through a propagating mechanism. As further detailed herein, the software code can be propagated to nodes in a computer system such that the software code is executed only on a class of targeted nodes and self-destructs after a defined expiry time. Further, an aspect of the invention includes identifying an appropriate propagation mechanism based on the class of the targeted nodes.

In contrast to disadvantageous existing approaches, at least one embodiment of the invention does not require knowledge of the system to be maintained a priori. Additionally, embodiments of the invention can provide more coverage than agentless-based mechanisms.

As described further herein, when a new discovery or maintenance request is received, an aspect of the invention includes assessing the request and determining the class of systems to which the request applies. A propagation mechanism for the given class of systems is selected and an agent with the appropriate carrier mechanisms and payload is built or generated. The mechanism is selected based on a combination of criteria that can include, for example, the nature of the payload, the expected configurations of the target system class and previous success rates of mechanisms against similar classes. By way of example, the agent can be an executable compiled and packaged from root carriers, payload executables, and/or other scripts that need to be invoked to manage communication back to the central management systems and/or the housekeeping of the target systems on identification.

Additionally, the agent is deployed on seed devices and an aspect of the invention further includes beginning to spread and propagate the agent at this point. As used herein, seed devices are the devices in the network that may be potentially connected through (or may, in the future, be connected directly to) the target systems, or have a possibility of transferring the agents to other carriers who may, in turn, be connected to the target systems. An example can include the laptop of a system administrator, which is likely to connect to many servers during job activities of that administrator. The deployment to the seed device may be carried out either through a central server by using typical network ports and other holes to propagate the systems directly connected thereto within the vicinity. Such deployment can also be carried out in an organized manner, with complete awareness of the owners of the seed devices, by the owners themselves downloading and installing the agents.

The spreading or propagating is managed by executable scripts and agents that are embedded into the overall agent which triggers this process. In an example embodiment of the invention, these agents can be self-extracting archives that install certain scheduled scripts or run scheduled tasks to further find potential connected devices and replicate onto such devices if a vulnerability is found. At least one embodiment of the invention further includes monitoring and tracking the agent propagation and the rate of propagation across the target system class devices.

Agents which are successfully deployed after either breaching through the vulnerabilities of carriers and/or target systems, or by manual installation by the device owners who help in the spreading of the payload, run automatic scripts on the devices to send beacons back to the central monitoring servers. These beacons are transmitted using the ad-hoc networks of agents, such that even if the monitoring server is not connected to the device when the beacon is sent, the beacon can be cached by other agents who may observe the beacon and subsequently retransmit it.

As the agent discovers a new device, the payload is executed and the agent locally notifies the user and globally notifies the admin if it (that is, the agent) is connected to the network. Additionally, each propagated system tries to spread the propagation further. For example, if the class of the potential target device is available to the source device and does not match the desired target, propagation will not be spread thereto. However, in many cases, the class determination cannot be carried out at the source device, and thus an effort is made to propagate to any device in the vicinity so that the agents can self-assess the class if deployed on the system. Also, as noted herein, the agent self-destructs after a defined expiry time.

FIG. 1 is a diagram illustrating an agent skeleton, according to an embodiment of the present invention. By way of illustration, FIG. 1 depicts an agent 102, which includes a carriers component 104 and a payload component 106. The carriers component 104 can include capabilities such as email, a universal serial bus (USB), floppy disk, a network connection, a structured query language (SQL) database, a Word file, etc. The payload component 106 includes static components 108 such as a system scanner 110, a system classifier 112, a network notifier and/or local notifier 114 and a self-destroyer component 116. Additionally, the payload component 106 includes pluggable and/or configurable components 118 such as a target system classes component 120, a custom code component 122 and an agent lifespan component 124.

By way of illustration, consider the following example. A carrier 104 of email is chosen to discover systems in a group of laptops that need an upgrade of certain faulty graphic card firmware. The static components 108 which carry out the housekeeping are configured with components 118 including, for example, a card model 120 and custom code 122 to run a test on the graphic device driver to check for inconsistencies, crash history, and other issues, and according to the outcome, create a pop-up for a firmware upgrade. Configurable components 118 also include an agent lifespan 124 of three months, after which a new release will be made. Once an email broadcast is sent to the reachable audience, further email transactions can help propagate the agent to networks which are otherwise unreachable. The static components 108 in these agents time-out after three months and self-destruct (via component 116) to stop propagating further.

Figure 2:
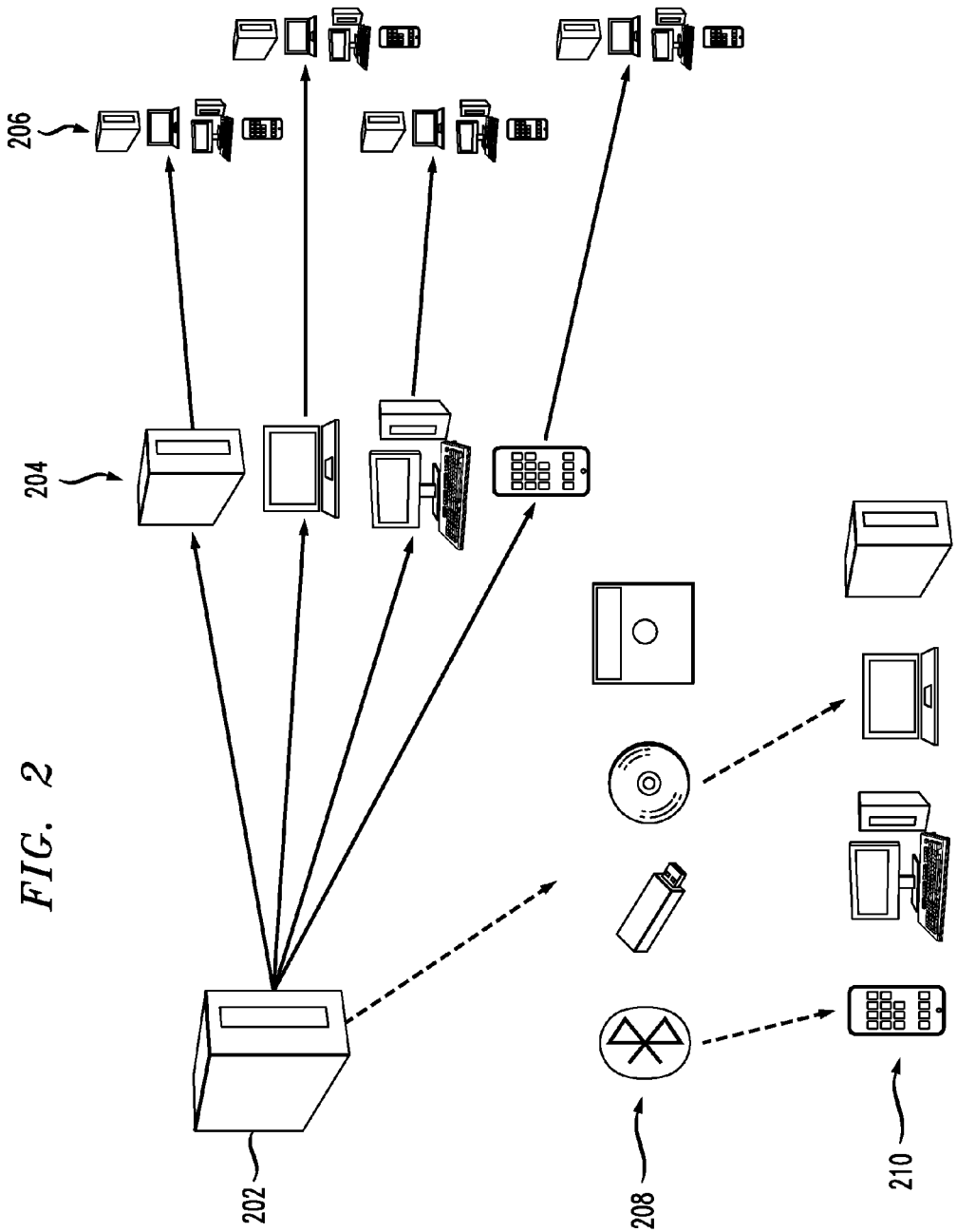
FIG. 2 is a diagram illustrating an example IT infrastructure, according to an embodiment of the invention.

FIG. 2 is a diagram illustrating IT infrastructure, according to an embodiment of the invention. By way of illustration, FIG. 2 depicts a server 202, which can send emails, application operating system (OS) vulnerabilities, etc. to connected devices 204, which send emails or executable files over network file shares to other connected devices 206. Additionally, FIG. 2 depicts server 202 deploying agents on storage media such as a compact disk, universal serial bus (USB) drive and/or floppy disk 208, which can retransmit the agents to unconnected devices 210.

Figure 3:
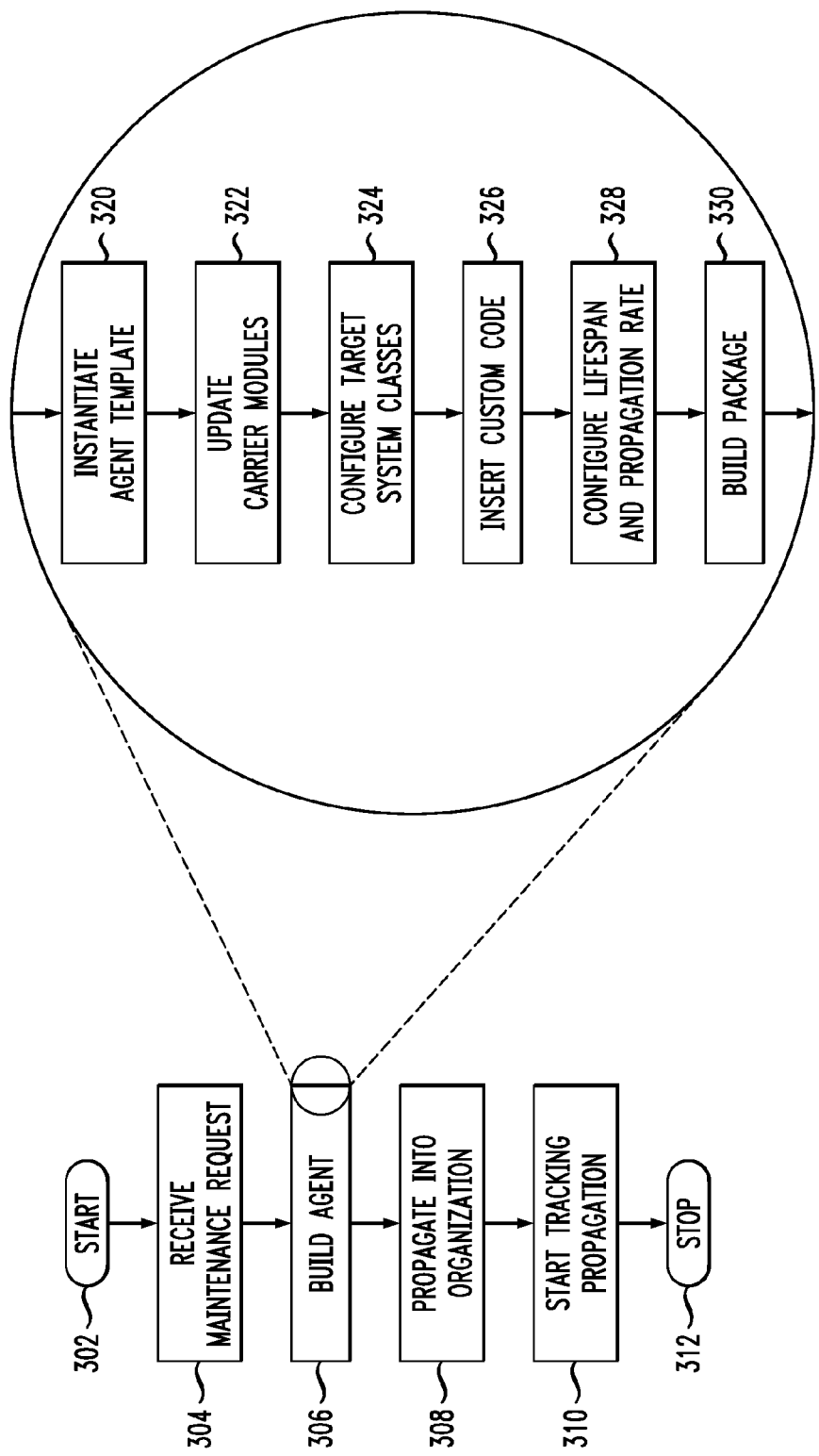
FIG. 3 is a flow diagram illustrating handling of a new maintenance request, according to an embodiment of the present invention.

FIG. 3 is a flow diagram illustrating handling of a new maintenance request, according to an embodiment of the present invention. Step 302 includes starting the sequence. Step 304 includes receiving a maintenance request. Step 306 includes building an agent. Step 308 includes propagating the relevant organization or system with the agent. Step 310 includes starting tracking of the propagation, and step 312 includes stopping or ending the sequence.

As also illustrated in FIG. 3, step 306—building an agent—includes multiple sub-steps. Accordingly, sub-step 320 includes instantiating an agent template. Sub-step 322 includes updating carrier modules with information about the payload and the desired class of systems, as well as conditions and rules for propagation. Sub-step 324 includes configuring target system classes. This step can include a semi-supervised process that is done automatically by identifying example target systems, or by manual specification of system attributes (such as device manufacturer, operating system, version, installed software, etc.), or via a combination of the two.

Sub-step 326 includes inserting a custom code into the final package which is to be compiled into the agent. Sub-step 328 includes configuring a lifespan and propagation rate for the agent, which can include a semi-supervised approach based on initial specifications provided by administrators, as well as behavior learned from historical performance of similar agents. Further, sub-step 330 includes building the agent package.

Figure 4:
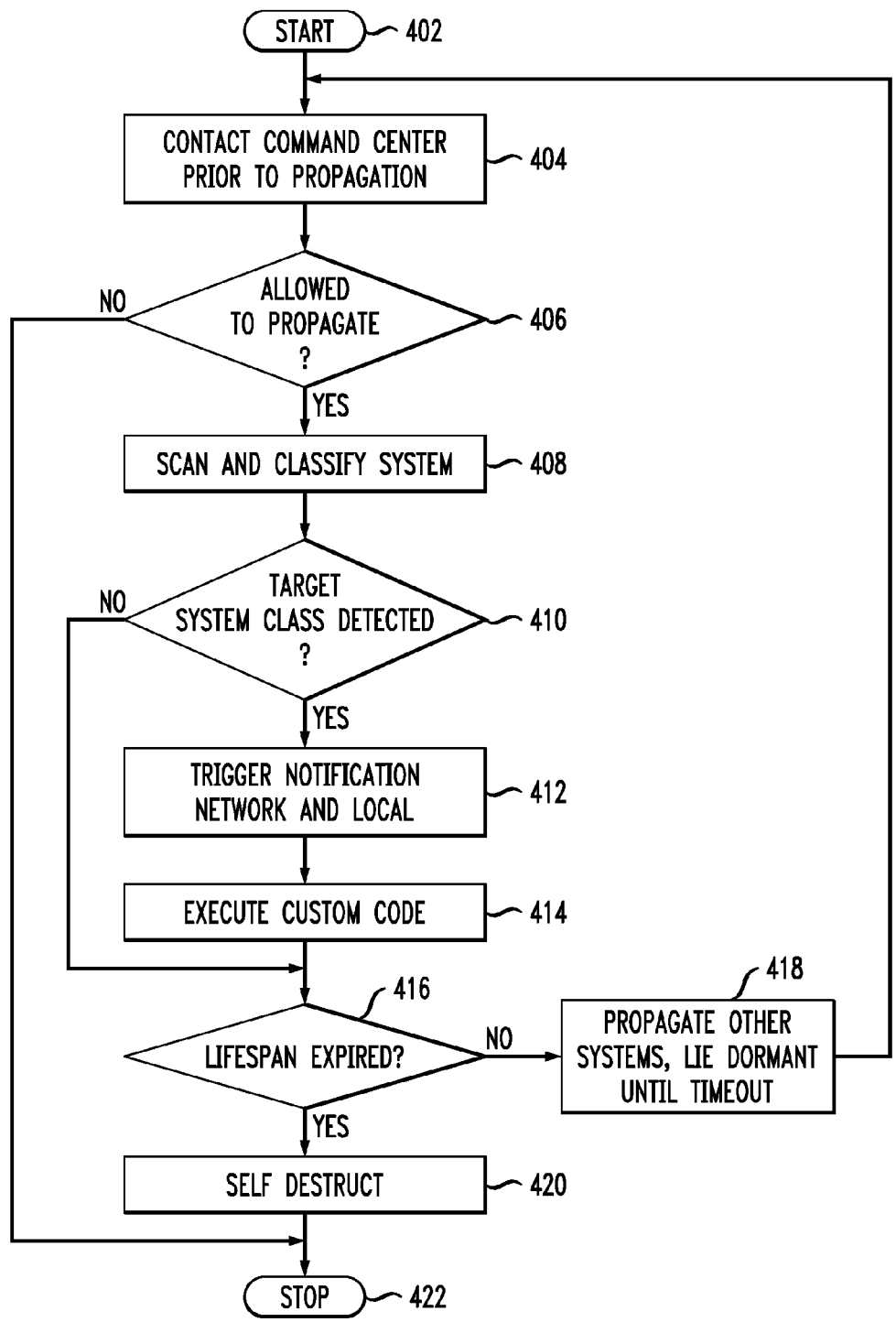
FIG. 4 is a flow diagram illustrating handling system propagation, according to an embodiment of the invention.

FIG. 4 is a flow diagram illustrating handling system propagation, according to an embodiment of the invention. Step 402 includes starting the sequence. Step 404 includes contacting the command center prior to propagating the organization/system with an agent. Accordingly, step 406 includes determining whether or not the propagation will be allowed. If no, the process stops (with step 422). If yes, then step 408 includes scanning and classifying the system. By way of example, propagation may not be allowed for various reasons such as the agent becoming outdated or unnecessary due to system changes, the development of new versions of the agents, all target systems having been discovered, etc. Thus, it is preferable to seek permission, if possible, before propagating.

Step 410 includes determining whether a target system class is detected. If yes, step 412 includes triggering a notification (network and local) and step 414 includes executing custom code. If no target system class is detected, the sequences proceeds to step 416 which includes determining if a lifespan has expired. If yes, the agent self-destructs in step 420 (and the sequences ends in step 422). If no, the sequence proceeds to step 418 which includes propagating other systems and lying dormant until a timeout.

By way of further illustration, consider the following. M is a maintenance request that is to be applied to a targeted class of systems $(t_1, t_2 \ldots t_n)$ from the set T representing a class S within an IT infrastructure. An agent template $VA_M$ is initiated and instantiated for class S using a set of carrier mechanisms, $c_1, c_2 \ldots c_k$. As described herein, carrier mechanisms are types of mechanisms through which an agent may propagate, such as file transfers USB drives, web downloadable executables, Bluetooth® and/or multimedia messaging service (MMS), etc. The set of propagation mechanisms, I, to which the system in class S is vulnerable is selected. In determining whether a system is vulnerable to a particular propagation mechanism, some elimination can be done via understanding of device capabilities versus carrier mechanisms. For example, MMS cannot be used for desktop servers.

In at least one embodiment of the invention, custom code $C_M$ is inserted into the agent template $VA_M$ to perform maintenance and other housekeeping tasks. Such tasks may include installation of a new patch, running scripts to find installed software, bringing visual pop-ups to notify administrators of a need for maintenance, etc. The lifespan $L_M$ and the propagation spread rate $R_M$ of $VA_M$ are configured as amounts of time or number of hops. As used herein, one hop is the movement of an agent from one potential target to another, before reaching the ultimate target on which the agent needs to deploy and execute the payload. Subsequently, $VA_M$ is built and propagation is initiated on seed systems $T_s$ from the targeted system class.

In at least one embodiment of the invention, before each propagation, $VA_M$ contacts the command center of the system to obtain authorization for propagation. On each system $t_X$ to be propagated, the system is scanned and classified. If the system class is equivalent to S, the custom code of the agent is executed thereupon and a system user (locally) and central admin (globally) are notified. If the system class is not equivalent to S, the agent remains dormant in the system until the end of lifespan $L_M$ and continues propagating other systems at rate $R_M$.

Figure 5:
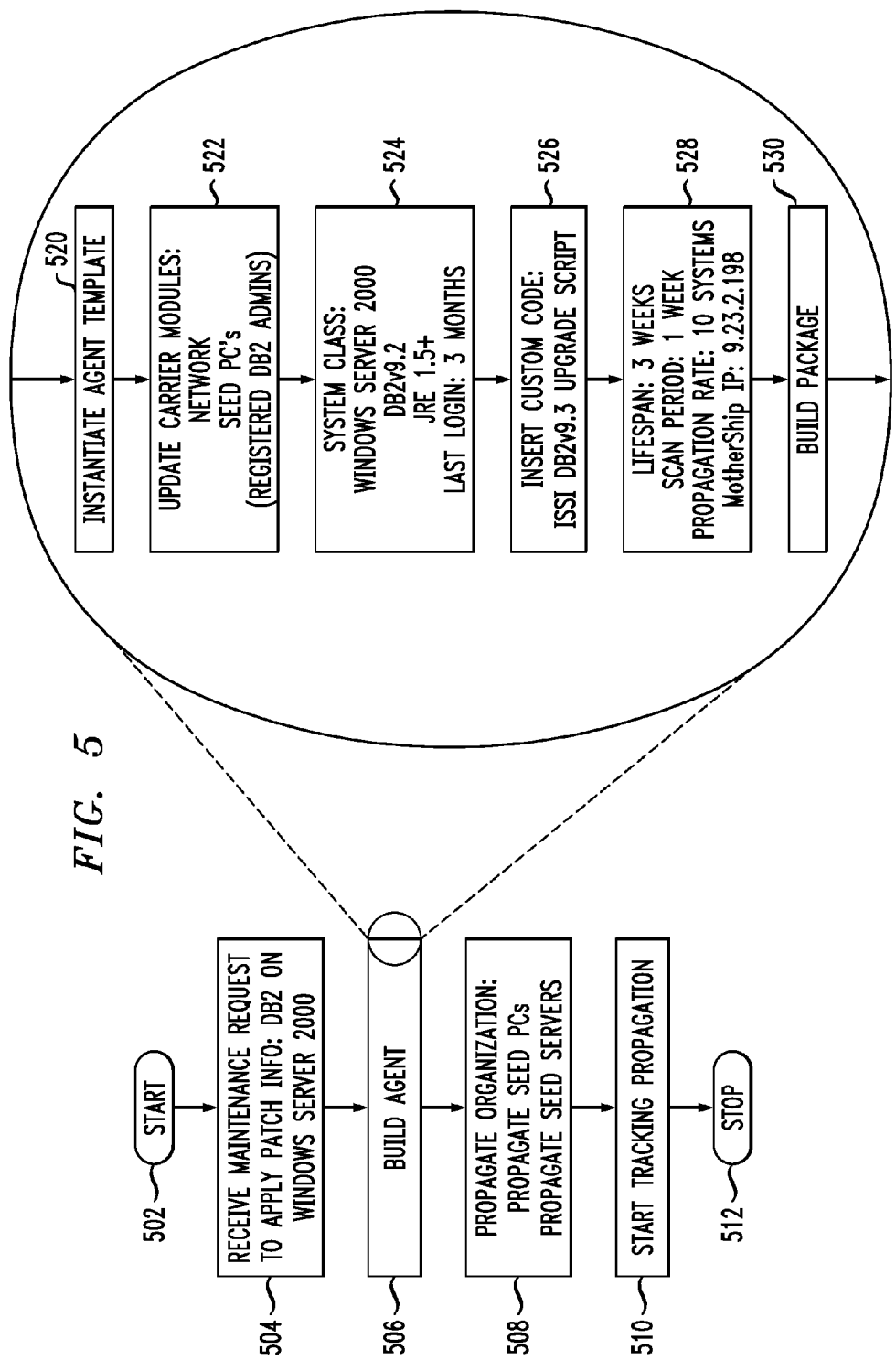
FIG. 5 is a flow diagram illustrating an example new patch installation, according to an embodiment of the present invention.

FIG. 5 is a flow diagram illustrating an example new patch installation, according to an embodiment of the present invention. Step 502 includes starting the sequence. Step 504 includes receiving a maintenance request to apply patch information (for example, a DB2 on a Windows® server 2000). Step 506 includes building an agent. Step 508 includes propagating the relevant organization or system (for example, propagating seed personal computers (PCs) and seed servers). Step 510 includes starting tracking of the propagation, and step 512 includes stopping the sequence.

As also illustrated in FIG. 5, step 506—building an agent—includes multiple sub-steps. Accordingly, sub-step 520 includes instantiating an agent template. Sub-step 522 includes updating carrier modules (for example, a network, seed PCs and registered DB2® administrators). Sub-step 524 includes configuring target system classes (such as, for example, Windows® server 2000, DB2®v9.2, JRE 1.5+, etc.). Sub-step 526 includes inserting a custom code (such as for example, an ISSI DB2®v9.3 upgrade script). Sub-step 528 includes configuring a lifespan, a scan period, a propagation rate and a mother ship internet protocol (IP) for the agent, and sub-step 530 includes building the package.

Figure 6:
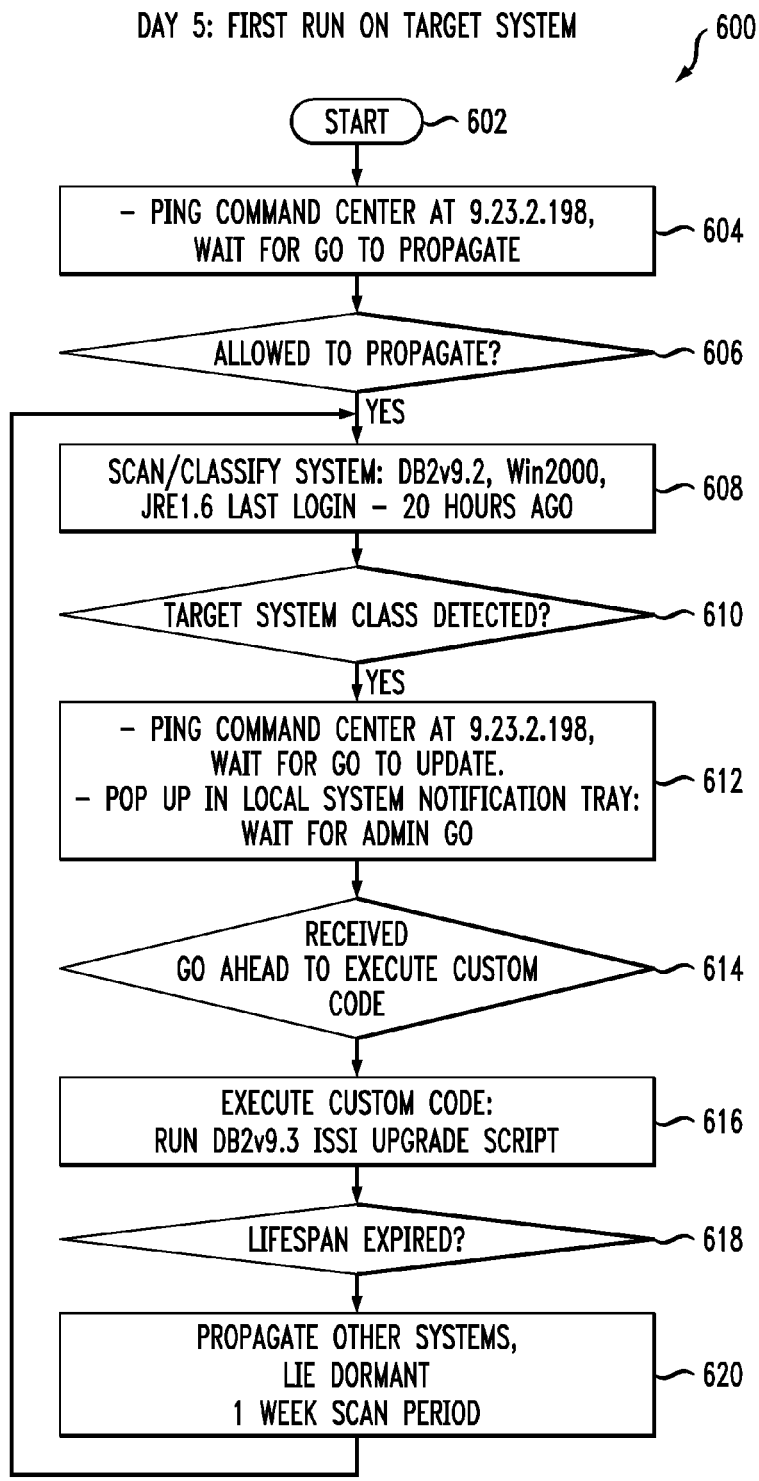
FIG. 6 is a set of flow diagrams illustrating an example scenario, according to an embodiment of the present invention.
Figure 6:
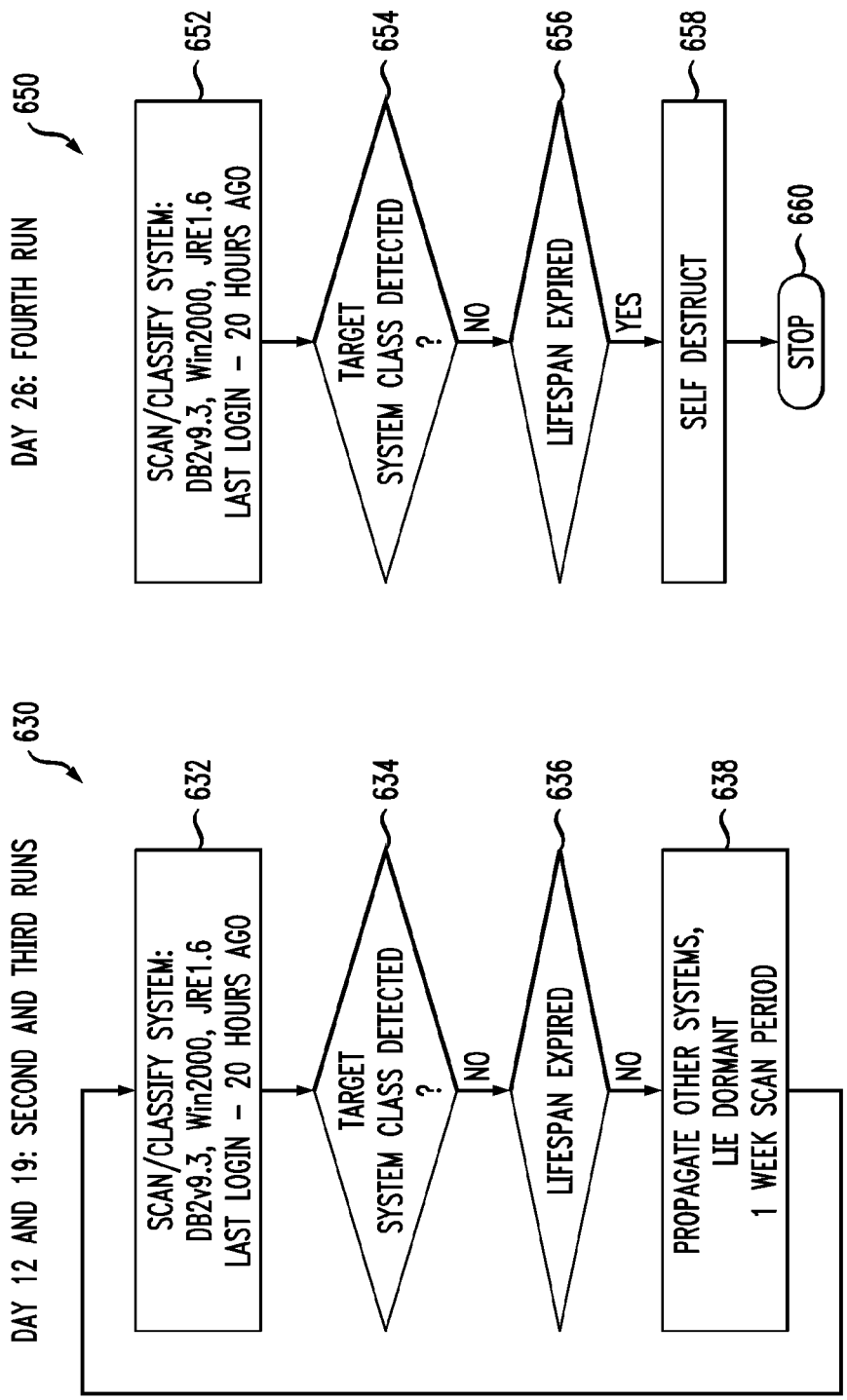

FIG. 6 is a set of flow diagrams illustrating an example scenario, according to an embodiment of the present invention. By way of illustration, FIG. 6 depicts a flow chart 600 at day 5 representing a first run on a target system, a flow chart 630 at day 12 and day 19 representing a second and third run, respectively, and a flow chart 650 at day 26 representing a fourth run. By way of example, such a timeline represents the sequence of activity leading to the outcome of the scheduled periodic runs.

The day 5 flow chart 600 includes the following steps. Step 602 includes starting the sequence. Step 604 includes contacting the command center (for example, at an example internet protocol IP address of the command center, or via other modes of identification such as a hostname) and waiting for approval to propagate. Step 606 includes ascertaining whether or not propagation is permitted. If yes, step 608 includes scanning and/or classifying the system. Step 610 includes determining if there is a target system class detected. If yes, step 612 includes contacting the command center and waiting for an update. Step 614 includes receiving approval to execute custom code and step 616 includes executing the code. Step 618 includes determining if a lifespan has expired. If no, step 620 includes propagating other systems and lying dormant for a one week scan period.

Flow chart 630 includes the following steps. Step 632 includes scanning and/or classifying the system. Step 634 includes determining if a target system class is detected. If no, step 636 includes determining if a lifespan has expired. If no, step 638 includes propagating other systems and lying dormant for a one week scan period.

Flow chart 650 includes the following steps. Step 652 includes scanning and/or classifying the system. Step 654 includes determining if a target system class is detected. If no, step 656 includes determining if a lifespan has expired. If yes (that is, the lifespan has expired), step 658 includes self-destruction of the agent and stopping the sequence in step 660.

Figure 7:
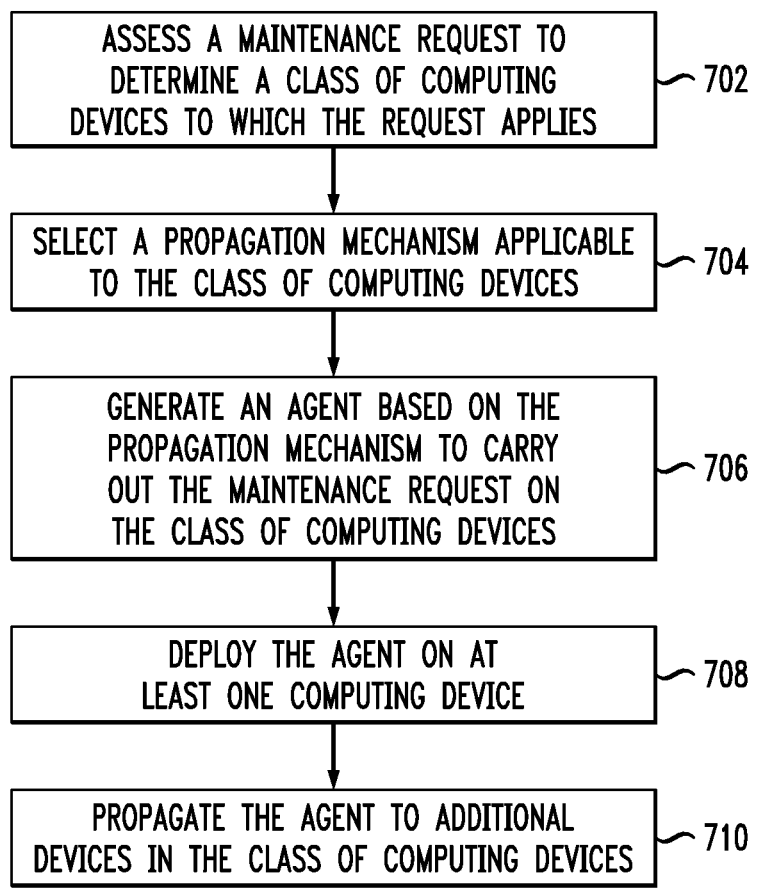
FIG. 7 is a flow diagram illustrating techniques for targeted maintenance of computing devices in a system, according to an embodiment of the invention.

FIG. 7 is a flow diagram illustrating techniques for targeted maintenance of computing devices in a system, according to an embodiment of the present invention. Step 702 includes assessing a maintenance request to determine a class of computing devices to which the request applies. Step 704 includes selecting a propagation mechanism applicable to the class of computing devices.

Step 706 includes generating an agent based on the propagation mechanism to carry out the maintenance request on the class of computing devices. Generating an agent can include, for example, instantiating an agent template, inserting custom code into the agent template, configuring an agent propagation rate at which additional devices in the class of computing devices are targeted for propagation, and configuring an agent lifespan, wherein the agent lifespan is the time period when an agent is actively executing on the class of computing devices. Additionally, in at least one embodiment of the invention, the agent self-destructs at the expiration of the agent lifespan.

Step 708 includes deploying the agent on at least one computing device in the class of computing devices. Step 710 includes propagating the agent to additional devices in the class of computing devices. Propagating includes executing code of the agent on each additional computing device upon discovering each of the additional computing devices.

The techniques depicted in FIG. 7 can also include tracking agent propagation and rate of propagation across the class of computing devices. Also, at least one embodiment of the invention includes obtaining pre-propagation authorization from a centralized command center of the system.

Figure 8:
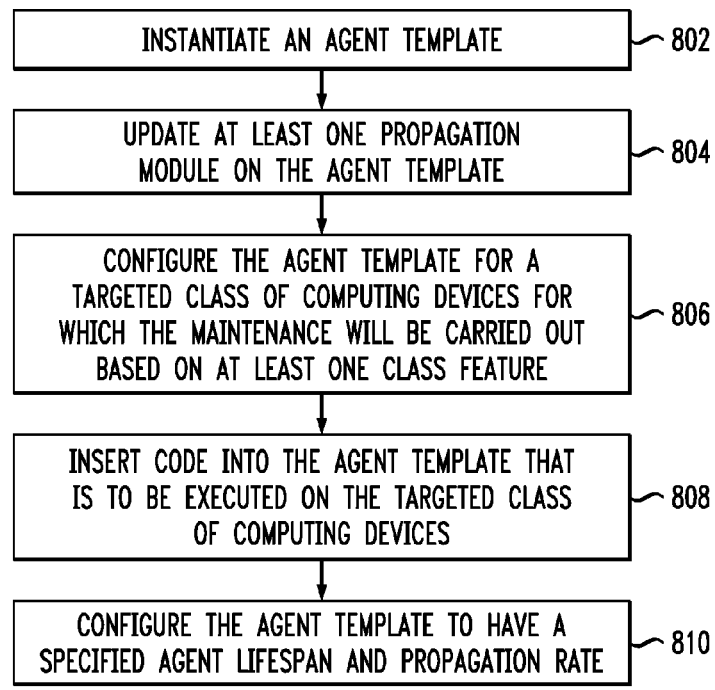
FIG. 8 is a flow diagram illustrating techniques for generating an agent to carry out targeted maintenance of computing devices in a system, according to an embodiment of the invention.

FIG. 8 is a flow diagram illustrating techniques for generating an agent to carry out targeted maintenance of computing devices in a system, according to an embodiment of the invention. Step 802 includes instantiating an agent template. Step 804 includes updating at least one propagation module on the agent template. A propagation module can include instructions for propagating the agent to a computing device. Also, propagation modules are maintained in a database (that can be periodically updated).

Step 806 includes configuring the agent template for a targeted class of computing devices for which the maintenance will be carried out based on at least one class feature. Step 808 includes inserting code into the agent template that is to be executed on the targeted class of computing devices.

Step 810 includes configuring the agent template to have a specified agent lifespan and propagation rate. The agent lifespan is the time period when an agent is actively executing on the class of computing devices. Additionally, in at least one embodiment of the invention, the agent self-destructs at the expiration of the agent lifespan. Also, the propagation rate is the rate at which devices in the class of computing devices are targeted for propagation.

The techniques depicted in FIG. 7 and FIG. 8 can also, as described herein, include providing a system, wherein the system includes distinct software modules, each of the distinct software modules being embodied on a tangible computer-readable recordable storage medium. All of the modules (or any subset thereof) can be on the same medium, or each can be on a different medium, for example. The modules can include any or all of the components shown in the figures and/or described herein. In an aspect of the invention, the modules can run, for example, on a hardware processor. The method steps can then be carried out using the distinct software modules of the system, as described above, executing on a hardware processor. Further, a computer program product can include a tangible computer-readable recordable storage medium with code adapted to be executed to carry out at least one method step described herein, including the provision of the system with the distinct software modules.

Additionally, the techniques depicted in FIG. 7 and FIG. 8 can be implemented via a computer program product that can include computer useable program code that is stored in a computer readable storage medium in a data processing system, and wherein the computer useable program code was downloaded over a network from a remote data processing system. Also, in an aspect of the invention, the computer program product can include computer useable program code that is stored in a computer readable storage medium in a server data processing system, and wherein the computer useable program code is downloaded over a network to a remote data processing system for use in a computer readable storage medium with the remote system.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in a computer readable medium having computer readable program code embodied thereon.

An aspect of the invention or elements thereof can be implemented in the form of an apparatus including a memory and at least one processor that is coupled to the memory and operative to perform exemplary method steps.

Figure 9:
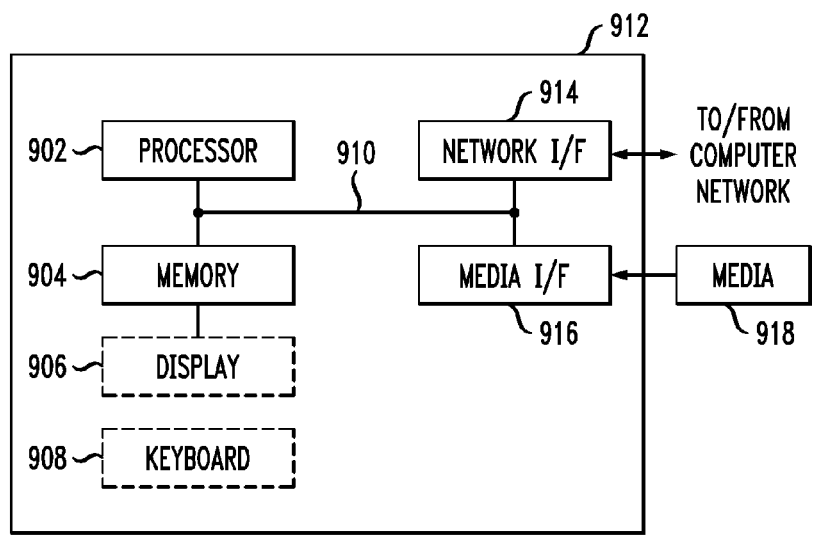
FIG. 9 is a system diagram of an exemplary computer system on which at least one embodiment of the invention can be implemented.

Additionally, an aspect of the present invention can make use of software running on a general purpose computer or workstation. With reference to FIG. 9, such an implementation might employ, for example, a processor 902, a memory 904, and an input/output interface formed, for example, by a display 906 and a keyboard 908. The term "processor" as used herein is intended to include any processing device, such as, for example, one that includes a CPU (central processing unit) and/or other forms of processing circuitry. Further, the term "processor" may refer to more than one individual processor. The term "memory" is intended to include memory associated with a processor or CPU, such as, for example, RAM (random access memory), ROM (read only memory), a fixed memory device (for example, hard drive), a removable memory device (for example, diskette), a flash memory and the like. In addition, the phrase "input/output interface" as used herein, is intended to include, for example, a mechanism for inputting data to the processing unit (for example, mouse), and a mechanism for providing results associated with the processing unit (for example, printer). The processor 902, memory 904, and input/output interface such as display 906 and keyboard 908 can be interconnected, for example, via bus 910 as part of a data processing unit 912. Suitable interconnections, for example via bus 910, can also be provided to a network interface 914, such as a network card, which can be provided to interface with a computer network, and to a media interface 916, such as a diskette or CD-ROM drive, which can be provided to interface with media 918.

Accordingly, computer software including instructions or code for performing the methodologies of the invention, as described herein, may be stored in associated memory devices (for example, ROM, fixed or removable memory) and, when ready to be utilized, loaded in part or in whole (for example, into RAM) and implemented by a CPU. Such software could include, but is not limited to, firmware, resident software, microcode, and the like.

A data processing system suitable for storing and/or executing program code will include at least one processor 902 coupled directly or indirectly to memory elements 904 through a system bus 910. The memory elements can include local memory employed during actual implementation of the program code, bulk storage, and cache memories which provide temporary storage of at least some program code in order to reduce the number of times code must be retrieved from bulk storage during implementation.

Input/output or I/O devices (including but not limited to keyboards 908, displays 906, pointing devices, and the like) can be coupled to the system either directly (such as via bus 910) or through intervening I/O controllers (omitted for clarity).

Network adapters such as network interface 914 may also be coupled to the system to enable the data processing system to become coupled to other data processing systems or remote printers or storage devices through intervening private or public networks. Modems, cable modem and Ethernet cards are just a few of the currently available types of network adapters.

As used herein, including the claims, a "server" includes a physical data processing system (for example, system 912 as shown in FIG. 9) running a server program. It will be understood that such a physical server may or may not include a display and keyboard.

As noted, aspects of the present invention may take the form of a computer program product embodied in a computer readable medium having computer readable program code embodied thereon. Also, any combination of computer readable media may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using an appropriate medium, including but not limited to wireless, wireline, optical fiber cable, RF, etc., or any suitable combination of the foregoing.

Computer program code for carrying out operations for aspects of the present invention may be written in any combination of at least one programming language, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. Accordingly, an aspect of the invention includes an article of manufacture tangibly embodying computer readable instructions which, when implemented, cause a computer to carry out a plurality of method steps as described herein.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, component, segment, or portion of code, which comprises at least one executable instruction for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It should be noted that any of the methods described herein can include an additional step of providing a system comprising distinct software modules embodied on a computer readable storage medium; the modules can include, for example, any or all of the components detailed herein. The method steps can then be carried out using the distinct software modules and/or sub-modules of the system, as described above, executing on a hardware processor 902. Further, a computer program product can include a computer-readable storage medium with code adapted to be implemented to carry out at least one method step described herein, including the provision of the system with the distinct software modules.

In any case, it should be understood that the components illustrated herein may be implemented in various forms of hardware, software, or combinations thereof, for example, application specific integrated circuit(s) (ASICS), functional circuitry, an appropriately programmed general purpose digital computer with associated memory, and the like. Given the teachings of the invention provided herein, one of ordinary skill in the related art will be able to contemplate other implementations of the components of the invention.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of another feature, integer, step, operation, element, component, and/or group thereof.

The corresponding structures, materials, acts, and equivalents of all means or step plus function elements in the claims below are intended to include any structure, material, or act for performing the function in combination with other claimed elements as specifically claimed.

At least one aspect of the present invention may provide beneficial effects such as, for example, identifying an appropriate propagation mechanism based on a class of targeted nodes and propagating a software code to the targeted nodes based on the identified propagation mechanism.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for targeted maintenance of computing devices in a system, the method comprising:
    assessing a maintenance request to determine a class of computing devices to which the request applies;
    selecting a propagation mechanism, from multiple propagation mechanisms, to apply to the class of computing devices based on multiple parameters, wherein said multiple parameters comprise an expected configuration of the class of computing devices and a previous success rate of one or more propagation mechanisms applied to the class of computing devices;
    generating an agent based on the propagation mechanism to carry out the maintenance request on the class of computing devices;
    wherein said generating comprises:
        instantiating an agent template and inserting custom code into the agent;
        configuring an agent lifespan, wherein the agent lifespan is the time period when an agent is actively executing on the class of computing devices; and
        configuring an agent propagation rate at which additional devices in the class of computing devices are targeted for propagation;
    deploying the agent on at least one computing device in the class of computing devices;
    and propagating the agent to additional devices in the class of computing devices;
    wherein at least one of the steps of assessing, selecting, generating, deploying, and propagating is carried out by a computer device.

2. The method of claim 1, comprising tracking agent propagation and rate of propagation across the class of computing devices.

3. The method of claim 1, wherein said propagating comprises executing code of the agent on each additional computing device upon discovering each of the additional computing devices.

4. The method of claim 1, wherein said generating comprises instantiating an agent template.

5. The method of claim 4, wherein said generating comprises inserting custom code into the agent template.

6. The method of claim 1, wherein said generating comprises configuring an agent lifespan, wherein the agent lifespan is the time period when an agent is actively executing on the class of computing devices.

7. The method of claim 6, wherein the agent self-destructs at the expiration of the agent lifespan.

8. The method of claim 1, wherein said generating comprises configuring an agent propagation rate at which additional devices in the class of computing devices are targeted for propagation.

9. The method of claim 1, comprising obtaining pre-propagation authorization from a centralized command center of the system.

10. An article of manufacture comprising a computer readable storage medium having computer readable instructions tangibly embodied thereon which, when implemented, cause a computer to carry out a plurality of method steps comprising:
    assessing a maintenance request to determine a class of computing devices to which the request applies;
    selecting a propagation mechanism, from multiple propagation mechanisms, to apply to the class of computing devices based on multiple parameters, wherein said multiple parameters comprise an expected configuration of the class of computing devices and a previous success rate of one or more propagation mechanisms applied to the class of computing devices;
    generating an agent based on the propagation mechanism to carry out the maintenance request on the class of computing devices;
    wherein said generating comprises:
        instantiating an agent template and inserting custom code into the agent;
        configuring an agent lifespan, wherein the agent lifespan is the time period when an agent is actively executing on the class of computing devices; and configuring an agent propagation rate at which additional devices in the class of computing devices are targeted for propagation;

deploying the agent on at least one computing device in the class of computing devices; and propagating the agent to additional devices in the class of computing devices.

11. The article of manufacture of claim 10, wherein the method steps comprise tracking agent propagation and rate of propagation across the class of computing devices.

12. The article of manufacture of claim 10, wherein said propagating comprises executing code of the agent on each additional computing device upon discovering each of the additional computing devices.

13. The article of manufacture of claim 10, wherein said generating comprises instantiating an agent template.

14. The article of manufacture of claim 13, wherein said generating comprises inserting custom code into the agent template.

15. The article of manufacture of claim 10, wherein said generating comprises configuring an agent lifespan, wherein the agent lifespan is the time period when an agent is actively executing on the class of computing devices.

16. The article of manufacture of claim 15, wherein the agent self-destructs at the expiration of the agent lifespan.

17. The article of manufacture of claim 10, wherein said generating comprises configuring an agent propagation rate at which additional devices in the class of computing devices are targeted for propagation.

18. The article of manufacture of claim 10, wherein the method steps comprise obtaining pre-propagation authorization from a centralized command center of the system.

19. A system for targeted maintenance of computing devices in a system, comprising:

at least one distinct software module, each distinct software module being embodied on a tangible computer-readable medium;

a memory; and at least one processor coupled to the memory and operative for:

assessing a maintenance request to determine a class of computing devices to which the request applies;

selecting a propagation mechanism, from multiple propagation mechanisms, to apply to the class of computing devices based on multiple parameters, wherein said multiple parameters comprise an expected configuration of the class of computing devices and a previous success rate of one or more propagation mechanisms applied to the class of computing devices;

generating an agent based on the propagation mechanism to carry out the maintenance request on the class of computing devices;

wherein said generating comprises:

instantiating an agent template and inserting custom code into the agent;

configuring an agent lifespan, wherein the agent lifespan is the time period when an agent is actively executing on the class of computing devices; and configuring an agent propagation rate at which additional devices in the class of computing devices are targeted for propagation;

deploying the agent on at least one computing device in the class of computing devices; and propagating the agent to additional devices in the class of computing devices.

20. A method for generating an agent to carry out targeted maintenance of computing devices in a system, the method comprising:

assessing a maintenance request to determine a targeted class of computing devices to which the maintenance request applies;

instantiating an agent template associated with a propagation mechanism, selected from multiple propagation mechanisms to apply to the targeted class of computing devices based on multiple parameters, wherein said multiple parameters comprise an expected configuration of the class of computing devices and a previous success rate of one or more propagation mechanisms applied to the class of computing devices;

updating at least one propagation module on the agent template;

configuring the agent template for the targeted class of computing devices for which the maintenance request will be carried out based on at least one class feature;

inserting code into the agent template that is to be executed on the targeted class of computing devices;

configuring the agent template to have a specified agent lifespan, wherein the agent lifespan is the time period when an agent is actively executing on the targeted class of computing devices;

configuring the agent template to have a specified agent propagation rate at which additional devices in the targeted class of computing devices are targeted for propagation; and propagating the agent template to additional devices in the targeted class of computing devices;

wherein at least one of the steps of assessing, selecting, generating, deploying, and propagating is carried out by a computer device.

21. The method of claim 20, wherein the at least one propagation module includes instructions for propagating the agent to a computing device.

22. The method of claim 20, wherein the at least one propagation module is maintained in a database.

23. The method of claim 20, wherein the agent lifespan is the time period when an agent is actively executing on the class of computing devices.

24. The method of claim 23, wherein the agent self-destructs at the expiration of the agent lifespan.

25. The method of claim 20, wherein the propagation rate is the rate at which devices in the class of computing devices are targeted for propagation.

* * * * *